United States Patent
Broker et al.

(10) Patent No.: US 11,209,183 B1
(45) Date of Patent: Dec. 28, 2021

(54) SYSTEMS AND METHODS FOR CONFIGURING CLIMATE CONTROL SYSTEM SPEED CONTROLS

(71) Applicant: Emerson Electric Co., St. Louis, MO (US)

(72) Inventors: John F. Broker, Warrenton, MO (US); Mike J. Moran, St. Louis, MO (US); Nayan Mishra, Richmond Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 16/948,113

(22) Filed: Sep. 3, 2020

(51) Int. Cl.
| | |
|---|---|
| *F24F 11/30* | (2018.01) |
| *F24F 11/52* | (2018.01) |
| *F24F 11/56* | (2018.01) |
| *F24F 11/64* | (2018.01) |
| *F24F 11/65* | (2018.01) |
| *F24F 11/86* | (2018.01) |
| *F24F 11/88* | (2018.01) |
| *G05B 19/042* | (2006.01) |
| *F24F 140/50* | (2018.01) |
| *F24F 140/60* | (2018.01) |

(52) U.S. Cl.
CPC .............. *F24F 11/30* (2018.01); *F24F 11/52* (2018.01); *F24F 11/56* (2018.01); *F24F 11/64* (2018.01); *F24F 11/65* (2018.01); *F24F 11/86* (2018.01); *F24F 11/88* (2018.01); *G05B 19/042* (2013.01); *F24F 2140/50* (2018.01); *F24F 2140/60* (2018.01); *F25B 2700/151* (2013.01); *F25B 2700/171* (2013.01); *G05B 2219/2614* (2013.01)

(58) Field of Classification Search
CPC .. F24F 11/30; F24F 11/52; F24F 11/56; F24F 11/64; F24F 11/65; F24F 11/86; F24F 11/88; F24F 2140/50; F24F 2140/60; G05B 19/042; G05B 2219/2614; F25B 2700/151; F25B 2700/171
See application file for complete search history.

(56) References Cited

U.S. PATENT DOCUMENTS

| | | | |
|---|---|---|---|
| 4,000,663 | A | 1/1977 | Fyler |
| 4,907,490 | A | 3/1990 | Taylor et al. |
| 5,841,358 | A | 11/1998 | Jamieson |
| 7,205,736 | B2 | 4/2007 | Knight et al. |
| 10,031,535 | B2 | 7/2018 | Rollins et al. |

(Continued)

FOREIGN PATENT DOCUMENTS

| | | |
|---|---|---|
| WO | 2014210583 A1 | 12/2014 |
| WO | 2016127136 A1 | 8/2016 |

*Primary Examiner* — Ramesh B Patel
(74) *Attorney, Agent, or Firm* — Armstrong Teasdale LLP (57) ABSTRACT

A method of controlling an HVAC system including a motor having five taps, an HVAC controller connected to the motor, and a mobile device includes receiving user input identification of the motor on a user interface of the mobile device. A plurality of operating conditions and more than five speed settings available for the identified motor are displayed on the user interface. The method includes receiving from the user a selected speed of the speed settings for a first operating condition of the plurality of operating conditions, and transmitting the selected speed and the associated first operating condition to the HVAC controller for use in controlling a speed of the motor during the plurality of operating conditions.

20 Claims, 5 Drawing Sheets

(56) References Cited

U.S. PATENT DOCUMENTS

| | | | |
|---|---|---|---|
| 2015/0148970 A1* | 5/2015 | Guzelgunler | F04D 15/0066 |
| | | | 700/282 |
| 2017/0167744 A1* | 6/2017 | Arensmeier | F24F 11/30 |
| 2018/0087795 A1* | 3/2018 | Okita | H05B 47/105 |
| 2018/0363934 A1* | 12/2018 | Vie | F24F 11/57 |
| 2018/0373280 A1* | 12/2018 | Rollins | B01F 3/04078 |
| 2019/0020247 A1* | 1/2019 | Shahi | H02K 11/27 |
| 2020/0141606 A1* | 5/2020 | Tournier | F04D 27/001 |
| 2020/0256576 A1* | 8/2020 | Powell | H02J 3/14 |

* cited by examiner

SYSTEMS AND METHODS FOR CONFIGURING CLIMATE CONTROL SYSTEM SPEED CONTROLS

FIELD

The field of the disclosure relates to climate control systems, and more particularly, to systems and methods for configuring speed controls for climate control systems.

BACKGROUND

In HVAC a popular type of fan motor has five taps. Each of these taps can be energized singly with 24 VAC, to give one of five speeds for a particular operating condition. For example, one tap may be used to run the fan at fan speed, two taps may be used for two heat speeds, and two taps may be used for two cool speeds. At least some systems use DIP switches on an HVAC controller to select which tap to energize for each mode. Such systems are typically limited to five speeds total, each mode must use a different speed, and configuration may be difficult. At least some known systems use push buttons and seven segment LEDs to configure the fan speeds in an HCVAC controller.

To be able to get more than 5 speeds with this type of motor, a programming change can be made to the motor to allow more than one tap at a time to be energized (i.e., simultaneous application of 24 VAC on more than one tap). The motor's controller is programmed to identify which taps are energized and interpret the combinations of energized and not energized (also referred to as active and inactive) taps as a speed instruction. That is, the energization states of the number of taps used for a speed command are treated similar to a binary code of the same number of digits as the number of taps used. The number of available speeds depends on how many taps are used in combination for the speed command and the particular configuration of the taps.

Different motor manufacturers use different numbers of opto-isolators in combination with the five taps. Some manufacturers use three opto-isolators to decode the five taps. Some manufacturers share an opto-isolator on 2 pairs of taps, one having a series diode and one not. This allows with the application of AC to give either a half wave signal, approximately 60 Hz, 50% duty cycle if a diode is in that tap, and a 120 Hz, near 100% duty cycle if no diode is present, as it is only off around the zero crosses of the AC sinusoidal wave. Some manufacturers use five opto-isolators, a separate one for each of the five taps. The different configurations result in different numbers of speeds that can be communicated using two states (active/energized or inactive/not energized) on the five taps. For motors in which three opto-isolators decode the five taps, there are up to 17 speeds available. For a motor in which each of the five taps is decoded separately, there are up to 31 possible speeds. Configuring an HVAC controller to select from 17 or 31 possible speeds by simultaneously energizing multiple taps can be difficult using dipswitches, push buttons and/or LEDs some known systems.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the disclosure is an HVAC system including a motor, an HVAC controller, and a mobile device. The motor has five taps and a motor controller to drive the motor based on energization of one or more of the five taps. The HVAC controller is communicatively connected to a plurality of the five taps of the motor and configured to control the motor based on a plurality of operating conditions. The HVAC control includes a controller communication interface and a memory. The mobile device includes a user interface and a mobile communication interface configured for communication with the controller communication interface of the HVAC control. The mobile device is configured to receive user input identification of the motor, display the plurality of operating conditions and more than five speed settings available for the identified motor on the user interface, receive from the user a selected speed of the speed settings for a first operating condition, and transmit the selected speed and the associated first operating condition to the controller communication interface of the HVAC control. The HVAC control is configured to store the selected speed in association with the first operating condition in the memory of the HVAC control, and to control the motor according to the selected speed when the first operating condition occurs.

Another aspect of the disclosure is a method of controlling an HVAC system including a motor having five taps, an HVAC controller connected to the motor, and a mobile device. The method includes receiving user input identification of the motor on a user interface of the mobile device, displaying a plurality of operating conditions and more than five speed settings available for the identified motor on the user interface, receiving from the user a selected speed of the speed settings for a first operating condition of the plurality of operating conditions, and transmitting the selected speed and the associated first operating condition to the HVAC controller for use in controlling a speed of the motor during the plurality of operating conditions.

Yet another aspect of the disclosure is a non-transitory computer readable medium having instructions embodied thereon. When executed by a processor, the instructions cause the processor to receive, on a user interface, user input identification of a motor having five taps, display a plurality of operating conditions and more than five speed settings available for the identified motor on the user interface, receive from the user a selected speed of the speed settings for a first operating condition of the plurality of operating conditions, and transmit the selected speed and the associated first operating condition to an HVAC controller for use in controlling a speed of the motor during the plurality of operating conditions.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Example embodiments are described herein with reference to an example heat exchange system for convenience. The teachings of this disclosure may be applied to any HVAC system or any other system including a five tap motor whose speed is to be controlled by a system controller.

Figure 1:
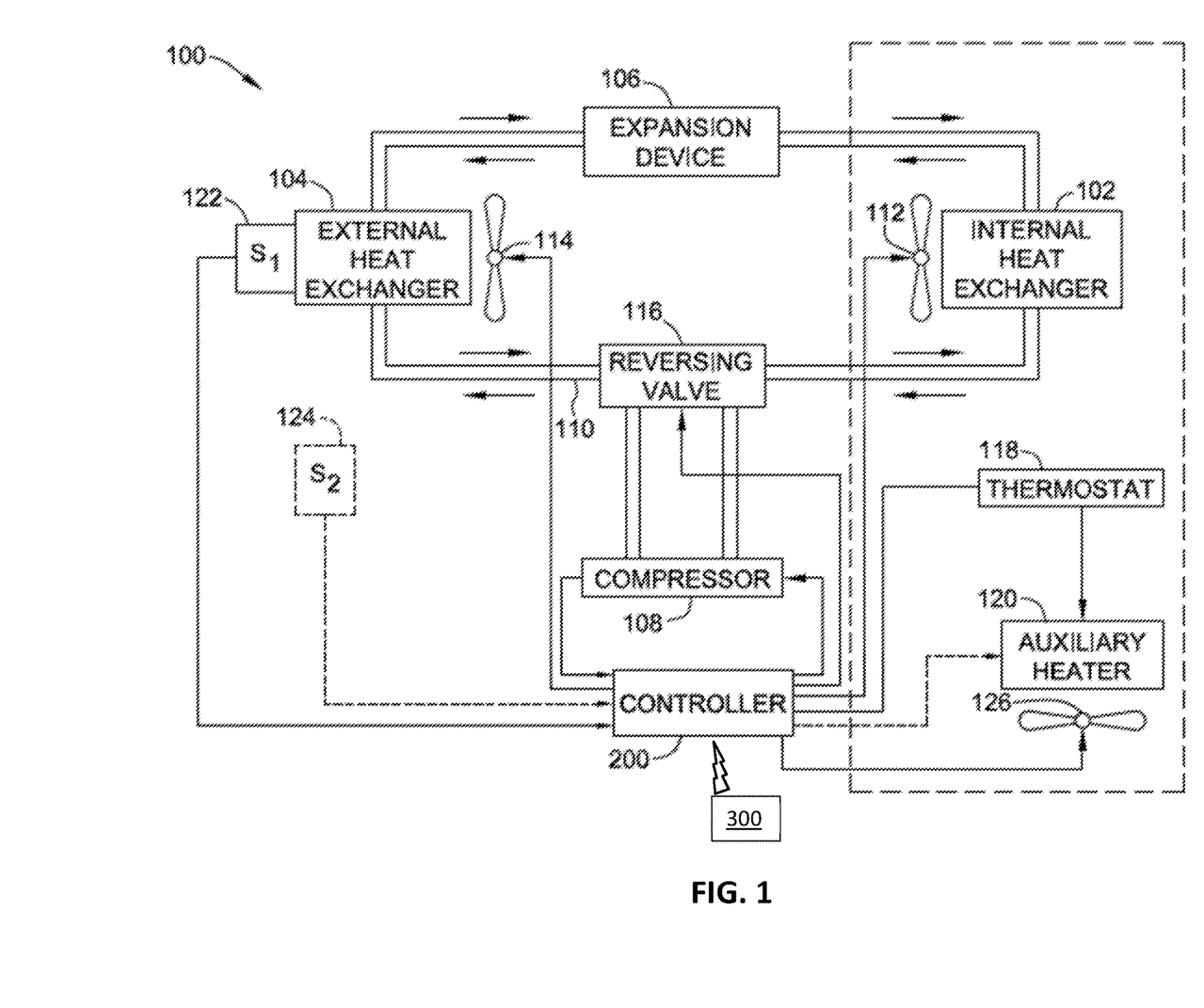
FIG. 1 is a schematic diagram of a heat exchange system including a controller.

Referring to FIG. 1, an example heat exchange system of one embodiment for heating and cooling a temperature controlled environment is indicated generally at 100. The heat exchange system 100 generally includes an internal heat exchanger 102, an external heat exchanger 104, an expansion device 106 fluidly connected between the heat exchangers 102, 104, and a compressor 108. The external heat exchanger 104, the expansion valve 106, the internal heat exchanger 102, and the compressor 108 are connected in fluid communication by conduits 110.

Refrigerant is circulated through the system 100 by the compressor 108. An internal blower 112 forces air from the temperature controlled environment into contact with the internal heat exchanger 102 to exchange heat between the refrigerant and the temperature controlled environment. The internal blower 112 subsequently forces the air back into the temperature controlled environment. Similarly, an external blower 114 forces air from an ambient environment into contact with the external heat exchanger 104, and subsequently back into the ambient environment. The direction of refrigerant flow is controlled by a reversing valve 116 fluidly connected between the compressor 108 and each heat exchanger 102, 104.

The operation of the system 100 is generally controlled by a controller 200 (sometimes referred to as an HVAC controller) and a thermostat 118 coupled to the controller 200. The thermostat 118 is coupled to one or more temperature sensors (not shown) for measuring the temperature of the temperature controlled environment. The controller 200 is coupled to the reversing valve 116, the compressor 108, and the blowers 112, 114 for controlling operation of the components in response to control signals received from the thermostat 118 and for controlling operation of the components during defrost cycles.

The system 100 also includes an auxiliary heater 120 and auxiliary blower 126 coupled to the controller 200 and the thermostat 118. The auxiliary heater 120 is configured to supply additional heat to the system 100 when the system is in a heating mode and/or to supply heat to the temperature controlled environment when the system 100 is in a defrost mode. In alternative embodiments, the auxiliary heater 120 is omitted from the system 100.

The system 100 also includes sensors 122, 124 for monitoring environmental conditions of the system 100. Sensors 122, 124 are coupled to the controller 200 for relaying information about the system 100 to the controller 200 in the form of electrical signals. In the illustrated embodiment, sensors 122, 124 are temperature sensors. The system 100 may include additional or alternative sensors, such as photo-optical sensors, pressure sensors, tactile sensors, and refrigerant pressure sensors.

In operation, the compressor 108 receives gaseous refrigerant that has absorbed heat from the environment of one of the two heat exchangers 102, 104. The gaseous refrigerant is compressed by the compressor 108 and discharged at high pressure and relatively high temperature to the other heat exchanger. Heat is transferred from the high pressure refrigerant to the environment of the other heat exchanger and the refrigerant condenses in the heat exchanger. The condensed refrigerant passes through the expansion device 106, and into the first heat exchanger where the refrigerant gains heat, is evaporated and returns to the compressor intake.

The controller 200 is wirelessly connectable with a mobile device 300, such as a smart phone, tablet, laptop, etc., (hereinafter referred to as "mobile device.") In other embodiments, the controller 200 is connectable to the mobile device 300 additionally or alternatively using a wired connection. The mobile device 300 has a processor and memory that includes and/or has access to a software application executable to configure the controller 200 as further described below. The mobile device 300 also has a display, such as a touchscreen and, in various embodiments, a voice processing capability.

Figure 2:
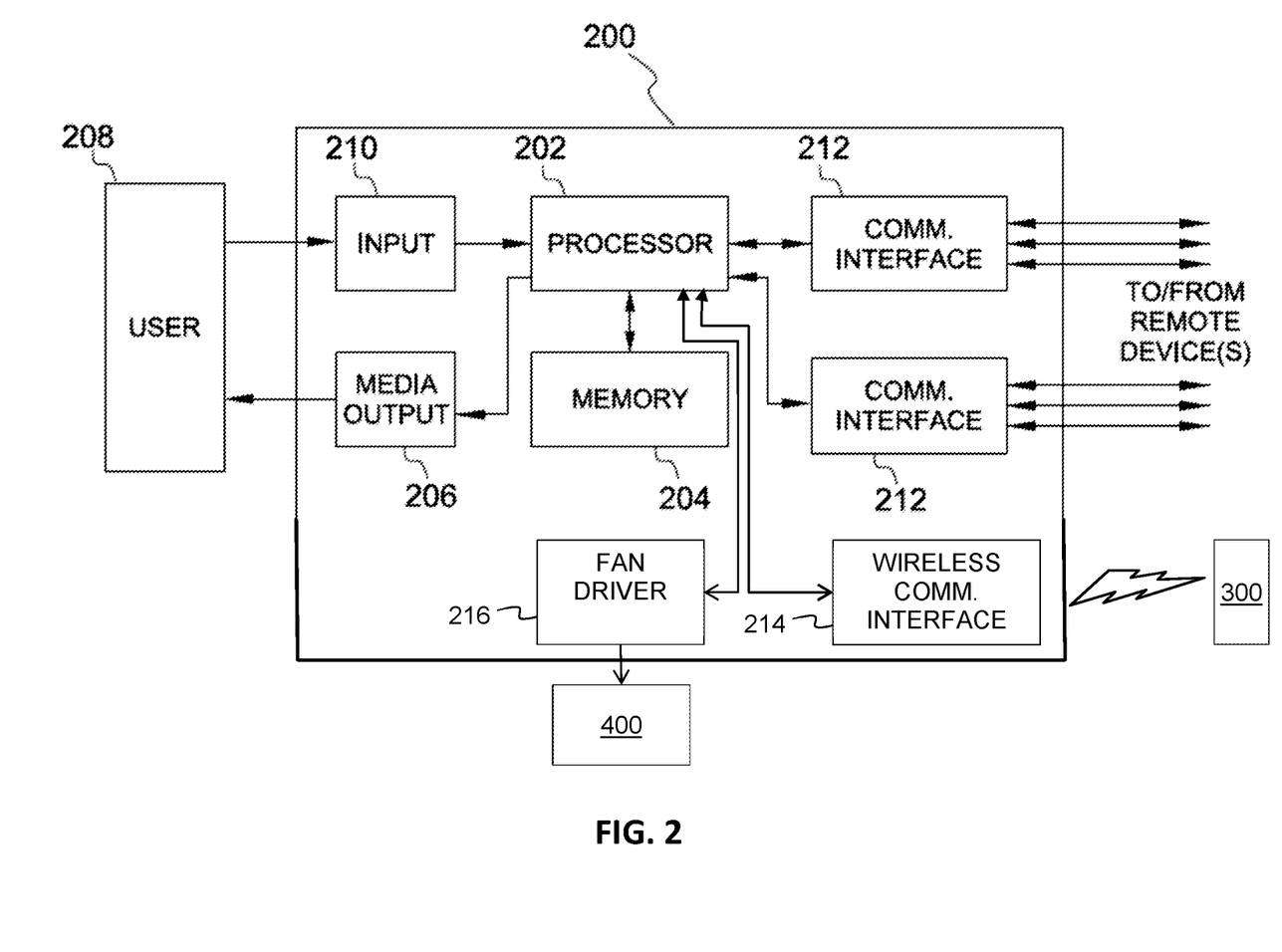
FIG. 2 is a block diagram of the controller of FIG. 1.

FIG. 2 is an example configuration of the controller 200 for use in the system 100. The controller 200 includes a processor 202, a memory 204, a media output component 206, an input device 210, wired communications interfaces 212, wireless communications interface 214, and a fan driver 216. Other embodiments include different components, additional components, and/or do not include all components shown in FIG. 2.

The processor 202 is configured for executing instructions. In some embodiments, executable instructions are stored in the memory 204. The processor 202 may include one or more processing units (e.g., in a multi-core configuration). The memory 204 is any device allowing information such as executable instructions and/or other data to be stored and retrieved. The memory 204 may include one or more computer-readable media.

The media output component 206 is configured for presenting information to a user 208. The media output component 206 is any component capable of conveying information to the user 208. In the example embodiment, the media output 206 is one or more LEDs. In some embodiments, the media output component 206 includes an output adapter such as a video adapter and/or an audio adapter. The output adapter is operatively connected to the processor 202 and operatively connectable to an output device such as a display device (e.g., a liquid crystal display (LCD), organic light emitting diode (OLED) display, cathode ray tube (CRT), "electronic ink" display, one or more light emitting diodes (LEDs)) or an audio output device (e.g., a speaker or headphones).

The controller 200 includes, or is connected to, the input device 210 for receiving input from the user 208. The input device is any device that permits the controller 200 to receive analog and/or digital commands, instructions, or other inputs from the user 208, including visual, audio, touch, button presses, stylus taps, etc. The input device 210 may include, for example, DIP switches, a variable resistor, an input dial, a keyboard/keypad, momentary push button/buttons, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 206 and the input device 210.

The memory 204 stores computer-readable instructions for control of the system 100 as described herein. In some embodiments, the memory area stores computer-readable instructions for providing a user interface to the user 208 via media output component 206 and, receiving and processing input from input device 210. The memory 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The communication interfaces 212 and 214 enable the controller 200 to communicate with remote devices and systems, such as sensors, valve control systems, safety systems, remote computing devices, other components of the system, and the like. The communication interfaces 212 may be wired or wireless communications interfaces that permit the computing device to communicate with the remote devices and systems directly or via a network. Wireless communication interfaces may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces 212 may use any suitable wired communication protocol for direct communication including, without limitation, USB, RS232, I2C, SPI, analog, and proprietary I/O protocols. In some embodiments, the wired communication interfaces 212 include a wired network adapter allowing the computing device to be coupled to a network, such as the Internet, a local area network (LAN), a wide area network (WAN), a mesh network, and/or any other network to communicate with remote devices and systems via the network.

In the example embodiment, the communication interface 214 (sometimes referred to as the controller communication interface) is a near field communication (NFC) transceiver operable for wireless communication with a nearby NFC communication enabled remote device, such as mobile device 300. Information may be retrieved from controller 200 or transmitted to controller 200 using the wireless communication interface 214 when the controller 200 is powered on and/or when it is powered off. Because NFC communication requires that the communicating transceivers be in close proximity (e.g., about one inch apart or closer), the mobile device 300 and the controller 200 may only communicate via NFC when the mobile device 300 is in close proximity to the controller 200. Thus, the user/installer may input into the mobile device 300 or the mobile device may select settings or other data to be provided to the controller 200 (e.g., the user may configure the system 100) when the mobile device 300 is not in close proximity to the controller 200 (and thus not communicating with the controller 200), and then place the mobile device 300 in close proximity to the controller 200 to establish communication and transmit the information from the mobile device 300 to the controller 200. References to communicating via NFC or being in communication with a device via NFC herein refers to being in communication when in close proximity to each other.

In other embodiments, the controller communication interface 214 may include a radio frequency (RF) transceiver, a Bluetooth® adapter, a Wi-Fi transceiver, a ZigBee® transceiver, an infrared (IR) transceiver, and/or any other device and communication protocol for wireless communication. In still other embodiments, the controller communication interface 214 is a wired communication interface.

In some embodiments, the only communication interface for communication between the controller 200 and a remote/mobile device is the controller communication interface 214. In such other embodiments, communication interfaces 212 may be present, but only for control of or communication with or control of one or more other component of the system 100.

Fan driver 216 is communicatively coupled to a motor 400 of a fan (also referred to as a blower) in the system 100. The motor 400 is a five tap motor. The motor 400 may be the motor of any of external blower 114, internal blower 112, or auxiliary blower 126. Further, the motor 400 may be any five tap motor within the system 100. In some embodiments, each blower in the system 100 is connected to a separate fan driver 216 and separately controlled. For simplicity of description, a single fan driver 216 and a single motor 400 will be described herein. The fan driver 216 instructs the motor 400 at what speed to run during various modes, such as heating, cooling, fan only, and the like. The modes are sometimes also referred to herein as operating conditions. AS will be described in more detail below, the fan driver 216 commands a particular speed by applying a 24 volt AC signal to one or more of the taps of the motor 400.

Figure 3:
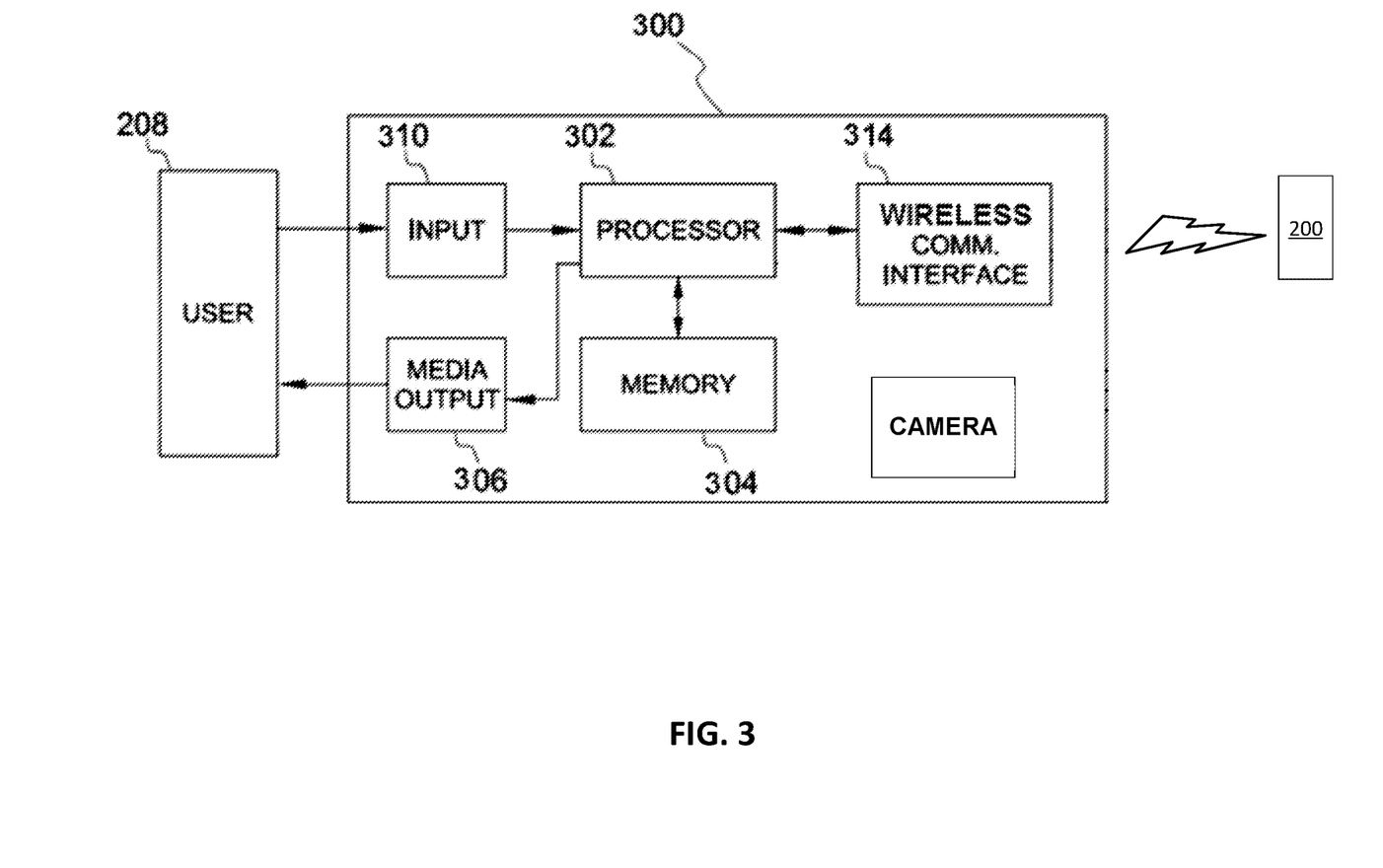
FIG. 3 is a block diagram of a mobile device for use with the system shown in FIG. 1.

FIG. 3 is an example configuration of the mobile device 300 for use with the system 100. The mobile device 300 includes a processor 302, a memory 304, a media output component 306, an input device 310, wired communications interfaces 312, and wireless communications interface 314. Other embodiments include different components, additional components, and/or do not include all components shown in FIG. 3.

The processor 302 is configured for executing instructions. In some embodiments, executable instructions are stored in the memory 304. The processor 302 may include one or more processing units (e.g., in a multi-core configuration). The memory 304 is any device allowing information such as executable instructions and/or other data to be stored and retrieved. The memory 304 may include one or more computer-readable media.

The media output component 306 is configured for presenting information to a user 308. The media output component 306 is any component capable of conveying information to the user 308. In some embodiments, the media output component 306 includes an output adapter such as a video adapter and/or an audio adapter. The output adapter is operatively connected to the processor 302 and operatively connectable to an output device such as a display device (e.g., a liquid crystal display (LCD), organic light emitting diode (OLED) display, cathode ray tube (CRT), "electronic ink" display, one or more light emitting diodes (LEDs)), and/or an audio output device (e.g., a speaker or headphones).

The mobile device 300 includes the input device 310 for receiving input from the user 308. The input device is any device that permits the mobile device 300 to receive analog and/or digital commands, instructions, or other inputs from the user 308, including visual, audio, touch, button presses, stylus taps, etc. The input device 310 may include, for example, keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 306 and the input device 310.

The memory 304 stores computer-readable instructions for operation of the mobile device 300. The memory 304 also stores computer-readable instructions for configuring and communicating with system 100, and specifically for configuring and communicating with the controller 200. In some embodiments, the memory 304 stores computer-readable instructions for providing a user interface to the user 308 via media output component 306 and, receiving and processing input from input device 310. The memory 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory.

The wireless communication interface 314 is a near field communication (NFC) transceiver operable for wireless communication with a nearby NFC enabled device, such as controller 200. Information may be retrieved from controller 200 or transmitted to controller 200 using the wireless communication interface 214 when the controller 200 is powered on and when it is powered off.

The mobile device 300 may be used to communicate with the controller 200 at different times. During production of the control board or before the control board is installed in the system 100 (or any other system), the user 208 may retrieve or create content such as control instructions, default system settings, controller firmware, or the like, and transmit the content to the controller 200 using the NFC wireless communications interfaces 314 and 214 of the mobile device 300 and controller 200. In particular, this permits the controller 200 to be programmed or updated by the manufacturer without powering the controller 200, and permits an installer or system manufacturer to program or update the controller 200 before the controller 200 is installed and without need for powering the controller. Thus, for example, an installer may configure the controller for a particular system installation in the shop, in the installation vehicle, or in any other location, without needing to be near the actual HVAC system and without needing to power the controller. After the controller is installed in the system 100, the user may use the mobile device 300 to determine the desired configuration of the system 100 and the controller 200 and transmit the configuration (e.g., configuration files, controller settings, and the like) to the controller 200 using the NFC wireless communications interfaces 314 and 214. After the controller 200 is installed and configured, the mobile device may be used to change the configuration or retrieve current configuration data, error data, troubleshooting data, operational history data, and the like from the controller 200 to using the NFC wireless communications interfaces 314 and 214.

By including an NFC wireless communication interface 214 on the controller 200, an installer may use a software application on mobile device 300 to configure the controller 200. A series of menu items may be provided to the installer, who may follow the menu items to install the HVAC control. In various embodiments, a software application menu may list a plurality of HVAC control types that could be configured using the software application, and a user may select from the menu a type of control to configure.

Additionally or alternatively, when a software application on a user's mobile device 300 has been connected with the controller 200 via NFC, the software application may query the HVAC controller 200 as to its type and thereafter automatically present the appropriate control configuration menu or preset (e.g., default) configuration settings to the user on the mobile device 300. In embodiments in which a controller 200 is to be configured as a replacement for an existing controller 200, a software application on a user mobile device 300 may query the existing controller to extract its programmable parameters, pre-populate selection criteria in the application with the extracted parameters, and download the selections to the replacement controller 200.

In some embodiments, a user may enter (e.g., by typing, by photographing, by barcode scanning, by RFID scanning, by voice command, or the like) a type and number for a particular HVAC controller 200 (which may be new or a replacement) into a software application on the user's mobile device 300, after which the application contacts a remote server (not shown) to obtain parameter selection criteria for the user-identified controller 200. The server may fetch the parameter selection information from a database and send the values to the application for download to the controller 200. In some embodiments, the parameter selection criteria is stored ahead of time in the mobile device 300, and does not need to be retrieved from the remote server during setup. Thus, the mobile device 300 may determine settings (such as default settings) at least in part by retrieving them from a remote server or retrieving them from its own memory.

Moreover, in some embodiments, the user may enter (e.g., by typing, by photographing, by barcode scanning, by RFID scanning, by voice command, or the like) identifying information, such as a type, a size, and part number, or the like, for multiple components of the system 100, such as the controller, the motor(s), the external heat exchanger, duct sizes/lengths, and the like, into a software application on the user's mobile device 300. The application may then determine and/or retrieve configuration settings for the controller 200 to allow the controller to control the system 100. The retrieved configuration settings may then be transmitted, via NFC communication, to the controller 200. In some embodiments, the user may, if desired, modify the retrieved configuration settings and/or set additional settings before downloading the settings to the controller 200 via NFC communication.

Thus, in various embodiments, all configurable parameters may be automatically selected, and the installer or other user may modify one or more parameters based, e.g., on installation specifics. As one example, an installer might adjust a parameter for the speed of a circulator, to suit the total duct length at an installation site. In other embodiments, less than all (including none) of the configurable parameters are automatically selected, and the installer or other user sets the parameters.

In some embodiments, the user inputs (e.g., via typing, capturing an image, barcode scanning, RFID reading, NFC communicating, or the like) details of the installation, into an installation application on the mobile device 300. The details of the installation can include, the specific motors used in the system, the size of the outdoor unit(s), the length of ducts, and the like. The application retrieves (either from a remote server or from memory 304) information on the identified components of the system and determines the recommended settings for the controller 200 to operate the system 100, including timings, alarms, motor control settings such as motor speed, CFM, or torque settings, and the like.

Figure 4:
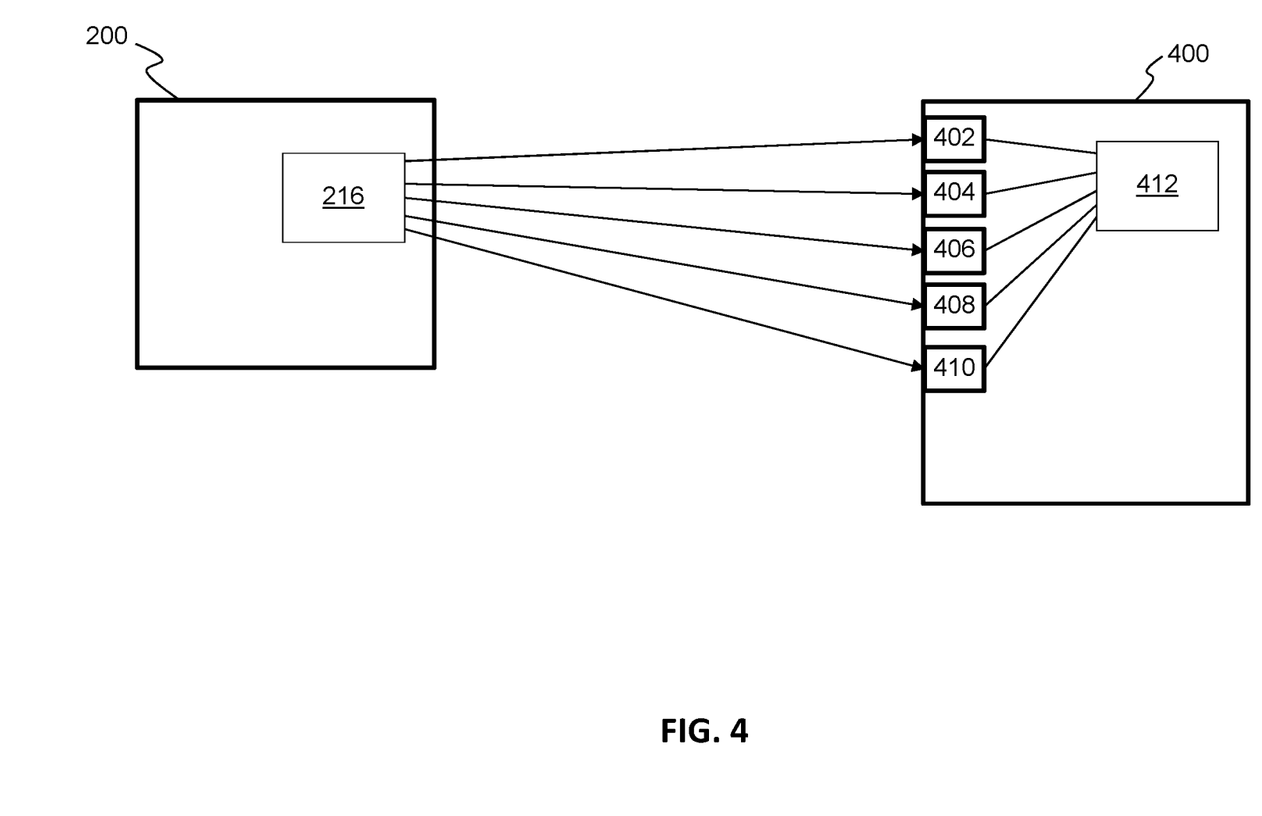
FIG. 4 is a block diagram of the controller of FIG. 1 and a motor of a fan in the system of FIG. 1.

One of the parameters to be configured in the system 100 using the above techniques is the fan speed for various operating modes. FIG. 4 is a block diagram of the controller 200 coupled to the motor 400 of one of the fans in the system 100. The motor 400 has five taps: a first tap 402, a second tap 404, a third tap 406, a fourth tap 408, and a fifth tap 410. The fan driver 216 is separately connected to each of the taps 402-410, and can separately apply a signal to each of the taps 402-410. A motor controller 412 monitors each of the taps 402-410 to identify which taps are energized. The motor controller the drives the motor 400 at the speed indicated by the combination of active/inactive (energized/not energized) taps 402-410. Table 1, below lists the combinations of active/energized/1 taps and inactive/not energized/0 taps that are useable to indicate the 17 possible speeds of a motor with an opto-isolator shared between taps 4 and 5 (i.e., the fourth tap 408 and the fifth tap 410), and an optoisolator shared between taps 2 and 3 (i.e., the second tap 404 and the third tap 406).

TABLE 1

| Tap 1 | Tap 2 | Tap 3 | Tap 4 | Tap 5 |
|---|---|---|---|---|
| 0 | 0 | 0 | 0 | 1 |
| 0 | 0 | 0 | 1 | 0 |
| 0 | 0 | 1 | 0 | 0 |
| 0 | 0 | 1 | 0 | 1 |
| 0 | 0 | 1 | 1 | 0 |
| 0 | 1 | 0 | 0 | 0 |
| 0 | 1 | 0 | 0 | 1 |
| 0 | 1 | 0 | 1 | 0 |
| 1 | 0 | 0 | 0 | 0 |
| 1 | 0 | 0 | 0 | 1 |
| 1 | 0 | 0 | 1 | 0 |
| 1 | 0 | 1 | 0 | 0 |
| 1 | 0 | 1 | 0 | 1 |
| 1 | 0 | 1 | 1 | 0 |
| 1 | 1 | 0 | 0 | 0 |
| 1 | 1 | 0 | 0 | 1 |
| 1 | 1 | 0 | 1 | 0 |

When no taps share an opto-isolator, the available number of speeds increases to 31 speeds. The table of active/energized/1 taps and inactive/not energized/0 taps is shown in table 2, below.

TABLE 2

| Tap 1 | Tap 2 | Tap 3 | Tap 4 | Tap 5 |
|---|---|---|---|---|
| 0 | 0 | 0 | 0 | 0 |
| 0 | 0 | 0 | 0 | 1 |
| 0 | 0 | 0 | 1 | 0 |
| 0 | 0 | 0 | 1 | 1 |
| 0 | 0 | 1 | 0 | 0 |
| 0 | 0 | 1 | 0 | 1 |
| 0 | 0 | 1 | 1 | 0 |
| 0 | 0 | 1 | 1 | 1 |
| 0 | 1 | 0 | 0 | 0 |
| 0 | 1 | 0 | 0 | 1 |
| 0 | 1 | 0 | 1 | 0 |
| 0 | 1 | 0 | 1 | 1 |
| 0 | 1 | 1 | 0 | 0 |
| 0 | 1 | 1 | 0 | 1 |
| 0 | 1 | 1 | 1 | 0 |
| 0 | 1 | 1 | 1 | 1 |
| 1 | 0 | 0 | 0 | 0 |

TABLE 2-continued

| Tap 1 | Tap 2 | Tap 3 | Tap 4 | Tap 5 |
|---|---|---|---|---|
| 1 | 0 | 0 | 0 | 1 |
| 1 | 0 | 0 | 1 | 0 |
| 1 | 0 | 0 | 1 | 1 |
| 1 | 0 | 1 | 0 | 0 |
| 1 | 0 | 1 | 0 | 1 |
| 1 | 0 | 1 | 1 | 0 |
| 1 | 0 | 1 | 1 | 1 |
| 1 | 1 | 0 | 0 | 0 |
| 1 | 1 | 0 | 0 | 1 |
| 1 | 1 | 0 | 1 | 0 |
| 1 | 1 | 0 | 1 | 1 |
| 1 | 1 | 1 | 0 | 0 |
| 1 | 1 | 1 | 0 | 1 |
| 1 | 1 | 1 | 1 | 0 |
| 1 | 1 | 1 | 1 | 1 |

Other motor configurations may use different numbers of opto-isolators, or different configurations resulting in different logic tables and different numbers of speeds. The mobile device 300 stores similar logic tables in memory 304, or retrieves such logic tables from a remote storage location. The logic tables are generally specific to a particular model of motor 400. However, multiple motors may share the same logic table (if they use the same configuration). Thus, separate logic tables may be stored for each known motor, or a smaller number of logic tables that covers the known motors may be stored along with reference to which logic table to use for each of the known motors.

The logic tables merely identify the number of speeds that may be encoded. Tables 1 and 2 may be considered to generally define coding for speeds 1-17 and 1-31 respectively. The particular speed associated with a particular encoding is generally determined by the motor manufacturer and programmed into the motor controller 412. Thus, for one manufacturer, the first speed encoding (or speed 1; i.e., 00001) in the tables may be a command for 100 RPM, while a second manufacturer uses the same code for 150 RPM. Thus, a correlation between the speed encodings and the actual speed (or at least the relative speed ratings of each encoding) for each motor is also stored and retrieved by the mobile device 300. In some embodiments the correlation is to actual speed, while some embodiments correlate the encoded speeds to each other only as to their speed relative to the other encodings (i.e., which speeds are faster/slower than each other speed).

The available fan speeds may not all be suitable for all operating conditions/modes. Thus, the mobile device 300 may also store for each motor the correlation of each speed encoding to its appropriate operating conditions/modes. Table 3, below, is an example table for a motor with two shared opto-isolators, showing the relative speeds of the encodings, and with which operating modes the encodings may be used.

TABLE 3

| Tap 1 | Tap 2 | Tap 3 | Tap 4 | Tap 5 | Order of relative speed | Fan | Heat | Cool |
|---|---|---|---|---|---|---|---|---|
| 0 | 0 | 0 | 0 | 1 | 1 | Fan 1 | | Cool 1 |
| 0 | 0 | 0 | 1 | 0 | 2 | | | Cool 2 |
| 0 | 0 | 1 | 0 | 0 | 3 | | | Cool 3 |
| 0 | 0 | 1 | 0 | 1 | 4 | | | Cool 4 |
| 0 | 0 | 1 | 1 | 0 | 5 | Fan 2 | | Cool 5 |
| 0 | 1 | 0 | 0 | 0 | 6 | | | Cool 6 |
| 0 | 1 | 0 | 0 | 1 | 7 | | | Cool 7 |

TABLE 3-continued

| Tap 1 | Tap 2 | Tap 3 | Tap 4 | Tap 5 | Order of relative speed | Fan | Heat | Cool |
|---|---|---|---|---|---|---|---|---|
| 0 | 1 | 0 | 1 | 0 | 8 | | Heat 1 | Cool 8 |
| 1 | 0 | 0 | 0 | 0 | 9 | Fan 3 | Heat 2 | Cool 9 |
| 1 | 0 | 0 | 0 | 1 | 10 | | Heat 3 | Cool 10 |
| 1 | 0 | 0 | 1 | 0 | 11 | | Heat 4 | Cool 11 |
| 1 | 0 | 1 | 0 | 0 | 12 | | Heat 5 | Cool 12 |
| 1 | 0 | 1 | 0 | 1 | 13 | Fan 4 | | Cool 13 |
| 1 | 0 | 1 | 1 | 0 | 14 | | | Cool 14 |
| 1 | 1 | 0 | 0 | 0 | 15 | | | Cool 15 |
| 1 | 1 | 0 | 0 | 1 | 16 | | | Cool 16 |
| 1 | 1 | 0 | 1 | 0 | 17 | | | Cool 17 |

To configure the speed settings for the system 100, the user will input identification of the motor 400 into the mobile device 300 in the manner of component identification discussed above. For example, the user may enter a part number of the motor 400, capture an image of an identification code (e.g., a barcode or QR code), input a name of the manufacturer and the name of the motor model, or may use any other suitable method for inputting identification of the motor 400. In some embodiments, the user may identify the motor 400, by identifying a larger component (such as a blower or fan) with which the motor 400 is integrated.

After identifying the motor 400, the mobile device retrieves (either from its own memory 304 or from a remote memory device) speed information on the identified motor. The speed information includes the appropriate speed encodings, their actual or relative speed correspondences, and the operating conditions for which the speeds are appropriate (e.g., Table 3, or similar data).

The mobile device displays to the user the plurality of operating conditions/modes to be configured and the speeds available for each. In some embodiments, the mobile device 300 only displays the appropriate available speeds for each of the operating conditions. For example, with the data from Table 3, the mobile device 300 would only display the $8^{th}$-$12^{th}$ speed settings for heat operating conditions. In other embodiments, the mobile device lists all available speeds and the user can freely select any desired speed for any operating condition.

Further, in some embodiments, the available mobile device updates the available speeds after the user has made one or more speed selections. The updating will typically include the removal of speeds that are no longer appropriate. For example, after a user selects a speed for a low cooling mode, any available slower speeds would be removed from availability for a high cooling mode, because the high cooling mode uses a higher speed than the low cooling mode. Similarly, the updating maintains proper relations between speeds for different stages of a multi-stage cooling/heating process.

The speeds displayed to the user may be displayed as actual speeds (e.g., in RPM), relative speeds (e.g., as listed in order in Table 3), or as named speeds (e.g., "High Speed Cooling", "Low Speed", "Speed 1", etc.). How the speeds are displayed may be determined by how the motor manufacturer identifies the available speeds, or the manufacturers naming may be converted to a consistent naming convention for use by the mobile device 300.

The user selects the speeds for each of the operating conditions from the available speeds. In some embodiments, the mobile device initially selects a default speed for each operating condition, and the user can change the selections as desired. In some embodiments, the mobile device 300 selects a default speed for each operating condition for which the user does not select a speed.

After the speeds are selected, whether defaults by the mobile device, selections by the user, or a combination of the two, the mobile device 300 transmits the selected speeds, and their associated operating conditions to the controller communication interface 214 of the HVAC control 200. The selected speed is transmitted as the encoding (i.e., which taps to energize) for the particular selected speed. In some embodiments, the mobile device transmits the selected speed without the encoding (but with an identifier of the motor), and the controller 200 retrieves the encodings for the selected speeds (e.g., from its memory 204).

The controller 200 stores the selected speeds in association with their respective operating conditions, and controls the motor according to the selected speed when its associate operating condition Occurs. For example, when a call for fan only operation is made, the controller 200 energizes the appropriate configuration of taps 402-410 stored in association with the fan only operation. The motor controller 412 detects the energized taps, identifies the speed indicated by the particular configuration of active and inactive taps, and drives the motor to operate at the selected speed.

Figure 5:
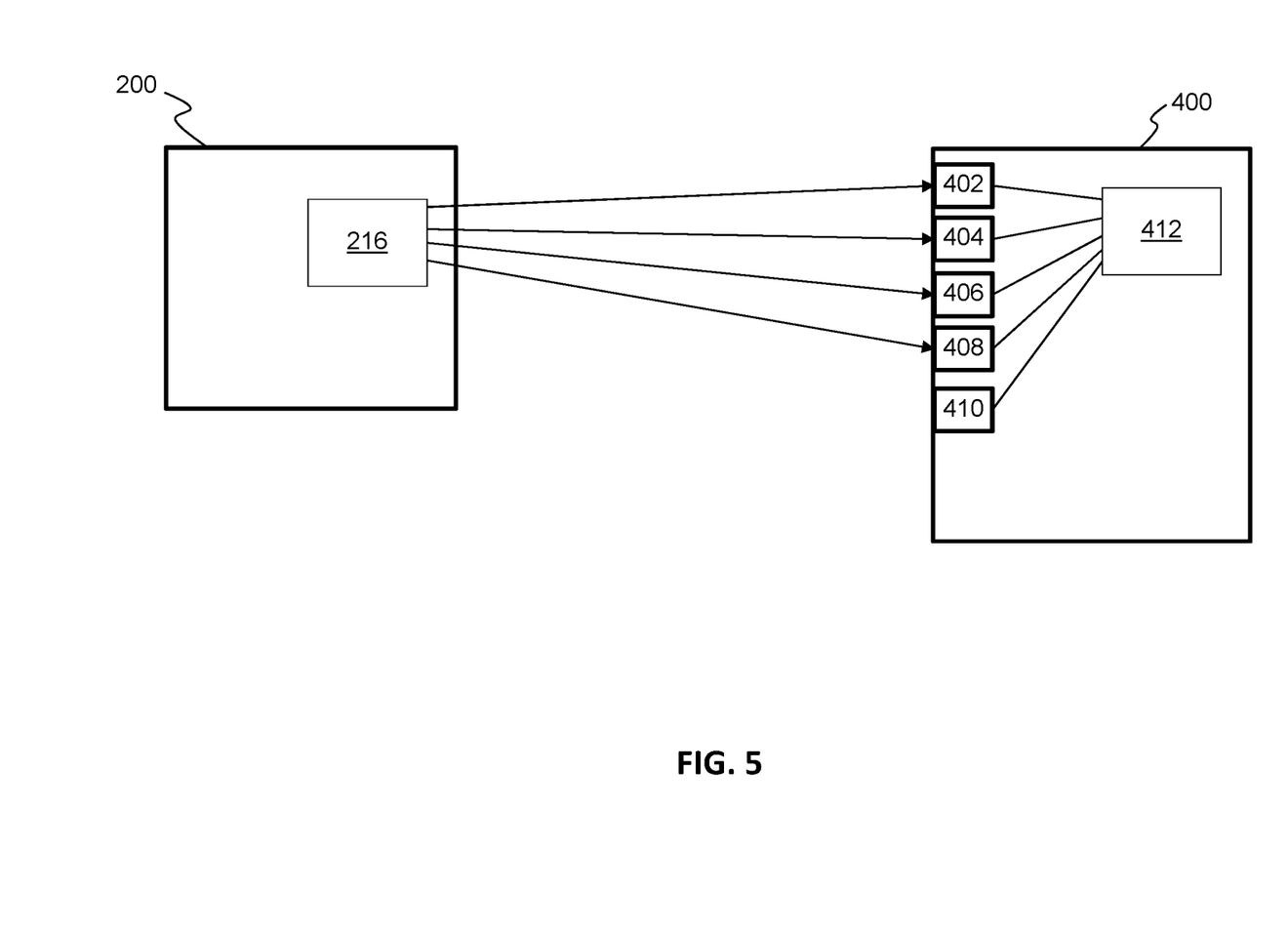
FIG. 5 is a block diagram of another configuration of the controller of FIG. 1 and a motor of a fan in the system of FIG. 1.

In other embodiments, the controller 200 is connected to less than five of the taps of the motor 400, and in some embodiments, the number of taps used to control the speed of the motor may be less than all of the taps to which the controller 200 is connected. FIG. 5 is a block diagram of another configuration of the controller 200 coupled to the motor 400 of one of the fans in the system 100. In this embodiment, the controller 200 is connected to and uses a plurality of the five taps that is less than all of the five taps 402-410 for sending the speed command signal to the motor 400. Specifically, the controller 200 is connected to and uses only four taps 402-408 for communicating a speed command. With four taps being able to be active/energized or inactive/not energized by the controller 200, there are up to sixteen possible speeds that can be commanded by the controller. While, fewer than the number of speeds available in the embodiments using all five taps (i.e., a 4 bit vs. a 5 bit signal), sixteen speeds is sufficient in many instances. In other embodiments, only four taps are used for controlling the speed, but the fifth tap may still be connected to the controller 200.

In other embodiments, only three taps are used for controlling speed. For example, the controller 200 may be connected to only taps 402-408, and uses only three taps 402-406 for communicating a speed command. With three taps being able to be active/energized or inactive/not energized by the controller 200, there are up to eight possible speeds that can be commanded by the controller. In some embodiments, more than three taps (i.e., four or five) are connected to the controller 200 even though only three taps are used for controlling speed.

Example embodiments of systems and methods for configuring an HVAC system are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. An HVAC system comprising:
    a motor having five taps and a motor controller to drive the motor based on energization of one or more of the five taps;
    an HVAC control, the HVAC controller communicatively connected to a plurality of the five taps of the motor and configured to control the motor based on a plurality of operating conditions, the HVAC control including a controller communication interface and a memory; and
    a mobile device, the mobile device including a user interface and a mobile communication interface configured for communication with the controller communication interface of the HVAC control, wherein:
    the mobile device is configured to receive user input identification of the motor, display the plurality of operating conditions and more than five speed settings available for the identified motor on the user interface, receive from the user a selected speed of the speed settings for a first operating condition, and transmit the selected speed and the associated first operating condition to the controller communication interface of the HVAC control; and
    the HVAC control is configured to store the selected speed in association with the first operating condition in the memory of the HVAC control, and to control the motor according to the selected speed when the first operating condition occurs.

2. The HVAC system of claim 1, wherein the controller communication interface and the mobile communication interface are both wireless communication interfaces.

3. The HVAC system of claim 2, wherein the mobile device includes at least one of a mobile phone and a tablet computer.

4. The HVAC system of claim 1, wherein the mobile device is configured to determine a configuration of active and inactive states for each of the plurality of the five taps of the motor to achieve the selected speed for the identified motor, and to transmit the configuration to the HVAC controller.

5. The HVAC system of claim 4, wherein the configuration includes at least two taps simultaneously active.

6. The HVAC system of claim 1, wherein the mobile device is configured to receive user input identification of the motor by parsing an image of a label of the motor as captured by a camera of the mobile device or by receiving a model number of the motor entered into the user interface.

7. The HVAC system of claim 1, wherein the mobile device is configured to update the speed settings available for operating conditions other than the first operating condition in response to the user selection of the selected speed for the first operating condition.

8. The HVAC system of claim 7, wherein the mobile device is configured to remove speed settings that conflict with the selected speed setting for the first operating condition.

9. The HVAC system of claim 1, wherein the mobile device is configured to determine default speed settings for the plurality of operating conditions, and transmit the default speed settings for any operating conditions for which the user did not select a speed setting.

10. A method of controlling an HVAC system including a motor having five taps, an HVAC controller connected to the motor, and a mobile device, the method comprising:
    receiving user input identification of the motor on a user interface of the mobile device;
    displaying a plurality of operating conditions and more than five speed settings available for the identified motor on the user interface;
    receiving from the user a selected speed of the speed settings for a first operating condition of the plurality of operating conditions; and
    transmitting the selected speed and the associated first operating condition to the HVAC controller for use in controlling a speed of the motor during the plurality of operating conditions.

11. The method of claim 10, wherein transmitting the selected speed and the associated first operating condition to the HVAC controller comprises wirelessly transmitting the selected speed and the associated first operating condition to the HVAC controller.

12. The method of claim 10, further comprising:
    determining a configuration of active and inactive states for each of the five taps of the motor to achieve the selected speed for the identified motor; and
    transmitting the configuration to the HVAC controller.

13. The method of claim 10, receiving user input identification of the motor comprises parsing an image of a label of the motor as captured by a camera of the mobile device or by receiving a model number of the motor entered into the user interface.

14. The method of claim 10, further comprising updating the speed settings available for operating conditions other than the first operating condition in response to the user selection of the selected speed for the first operating condition.

15. The method of claim 14, wherein updating the speed settings comprises removing speed settings that conflict with the selected speed setting for the first operating condition.

16. The method of claim 10, further comprising:
    determining default speed speed settings for the plurality of operating conditions; and
    transmitting the default speed settings for any operating conditions for which the user did not select a speed setting.

17. The method of claim 10, further comprising:
    storing the selected speed in association with the first operating condition in a memory of the HVAC control; and
    controlling the motor according to the selected speed when the first operating condition occurs.

18. A non-transitory computer readable medium having instructions embodied thereon that when executed by a processor cause the processor to:
    receive, on a user interface, user input identification of a motor having five taps;
    display a plurality of operating conditions and more than five speed settings available for the identified motor on the user interface;

receive from the user a selected speed of the speed settings for a first operating condition of the plurality of operating conditions; and transmit the selected speed and the associated first operating condition to an HVAC controller for use in controlling a speed of the motor during the plurality of operating conditions.

19. The non-transitory computer readable medium of claim 18, wherein the instructions further cause the processor to:

determine a configuration of active and inactive states for each of a plurality of the five taps of the motor to achieve the selected speed for the identified motor; and transmit the configuration to the HVAC controller.

20. The non-transitory computer readable medium of claim 18, wherein the instructions further cause the processor to update the speed settings available for operating conditions other than the first operating condition in response to the user selection of the selected speed for the first operating condition.

\* \* \* \* \*